United States Patent Office 3,406,036
Patented Oct. 15, 1968

3,406,036
SELECTIVE DEPOSITION METHOD AND ARTICLE FOR USE THEREIN

Richard S. McGrath, Hopewell Junction, and Norman W. Silcox, Poughkeepsie, N.Y., assignors to International Business Machines Corporation, Armonk, N.Y., a corporation of New York No Drawing. Filed July 8, 1965, Ser. No. 470,555
9 Claims. (Cl. 117—45)

ABSTRACT OF THE DISCLOSURE

The electroless deposition of metallic film upon selected areas of a glassy substrate, without plating the other areas of the substrate, is made possible by a substrate conditioning method which involves coating the selected areas with silicon monoxide, then exposing the substrate to dilute hydrofluoric acid long enough to etch the silicon monoxide coatings without appreciably etching the substrate. The etched coatings then can be rendered highly sensitive to electroless plating without sensitizing the smooth uncoated areas of the glassy substrate.

This invention relates to methods of depositing metallic films upon nonconductive substrates such as glass, and particularly to the selective deposition of metallic film upon a predetermined portion of a substrate surface.

Various methods of plating metals upon insulating substrates have been proposed, including such techniques as electroless deposition (otherwise known as chemical deposition or chemical reduction), vapor deposition and vacuum deposition. Because of its economic advantages, electroless deposition is preferred to the other plating methods wherever it is applicable. However, prior electroless deposition methods have not been successfully utilized for plating selected areas of a nonconductive substrate surface to the exclusion of the other surface areas, especially where the accuracy and quality of the deposited film patterns are required to be very high. Hence, where such selective deposition is required, it has been customary to use other deposition methods which are slower and more expensive, or else accept a lower quality product if electroless deposition is to be employed.

An object of the present invention is to provide a novel and economically advantageous method of depositing high quality, accurate film patterns upon selected areas of a nonconductive substrate surface.

A further object is to enable films to be deposited selectively by chemical reduction of predetermined active sites on a nonconductive substrate surface without having to mask the remainder of the substrate surface to prevent any film from being chemically deposited thereon.

A still further object is to provide an economically feasible method of treating a nonconductive substrate so that films of Permalloy, nickel, copper or other electroless plating materials can be chemically deposited upon selected areas of the substrate surface to the exclusion of the remaining substrate surface.

Still another object is to provide a substrate having an improved structure for use in an electroless deposition process to effect a selective plating of the substrate surface.

The foregoing and other objects, features and advantages of the invention will be apparent from the following more particular description of a preferred embodiment of the invention.

The present invention results from the discovery that silicon monoxide, which commonly is used as a base for improving the quality of vapor-deposited or vacuum-deposited films, also has properties hitherto unrealized which make it very useful in a selective electroless plating process. It has been customary to use a silicon monoxide coating as a base for vapor or vacuum deposition because of its extremely smooth surface texture. In an electroless deposition process, however, a smooth base generally is considered undesirable, because the reducing agent which is needed to start the chemical deposition will not adhere effectively to a smooth surface. Nevertheless, silicon monoxide can be made to serve as an excellent base for chemical plating if one appreciates the true chemical nature of this substance, as explained below:

Analysis of the material commonly known as "silicon monoxide" indicates that it probably is a mixture of silicon (Si) and silicon dioxide ($SiO_2$) in such proportions as to simulate, in a stoichiometric sense, the hypothetical compound SiO. If an etchant such as dilute hydrofluoric acid is brought into contact with a layer of silicon monoxide, the constituents of the silicon monoxide react differently, one being attacked by the etchant at a more rapid rate than the other, so that in a very short time the surface of the silicon monoxide layer is pitted with a high density of micropores. This is accomplished in far less time than would be required to produce any comparable etching of glass. Hence, if a glass substrate having a silicon-monoxide-coated area on its surface is immersed in dilute hydrofluoric acid for a short time, the silicon monoxide coating will etch very rapidly, whereas the uncoated glass may undergo no perceptible etching. The granular texture of the etched silicon monoxide makes it absorbent to a certain degree, whereas the adjoining glass surface is relatively impervious. This, in brief, is the principle upon which the present selective plating method is based.

By way of example, it will be explained herein how the principle of the invention can be employed for depositing a metallic film such as Permalloy upon a selected portion of a glass substrate by an electroless plating technique of a type that ordinarily would be used to plate the entire surface of the substrate. To condition the substrate for selective electroless deposition according to this method, a layer of silicon monoxide first is deposited upon the selected area of the substrate surface. Suitable methods of depositing silicon monoxide selectively are well-known and will not be described in great detail herein. Briefly, the selected area of the glass surface is given a thin coating of chromium, which readily adheres to glass and serves as a good base for the silicon monoxide layer. To accomplish this, the glass is heated to about 350° C. and is appropriately masked so that only the desired area is exposed. Chromium is vapor-deposited upon the unmasked area of the heated glass surface, for which it has a high affinity. Following this, a thin layer of silicon monoxide is vapor-deposited upon the chromium layer. The thickness of the silicon monoxide layer is not critical. Good results have been obtained with a silicon monoxide layer about 2,000 A. thick.

Silicon monoxide normally has a very smooth surface, which tends to render it unsuitable for electroless plating. However, the surface of the coating can be treated in accordance with the present invention so that it will absorb the reducing agent which is to be employed subsequently in the chemical deposition process, while at the same time the glass surface is kept smooth and impervious so that it will not retain any appreciable amount of the reducing agent. These objectives are accomplished in the present instance by exposing the glass substrate and its silicon monoxide coating to an etchant consisting of standard hydrofluoric acid (37% HF) diluted 1:1 in water. This etching solution is maintained at room temperature (about 25° C.), and the substrate is immersed therein for a period of about 20 seconds. This causes substantial etching of the silicon monoxide layer without any appreciable etching of the glass substrate. The dilute hydrofluoric acid preferentially attacks the grain boundaries of the silicon monoxide, introducing numerous micropores therein. However, the glass substrate (being essentially a supercooled liquid) has no well-defined grain boundaries and requires a comparatively long exposure to hydrofluoric acid in order to manifest any significant etching. The exposure time is sufficiently brief so that the glass, for practical purposes, is unetched whereas the silicon monoxide is densely pitted with micropores.

In conventional electroless plating practice a reducing agent such as stannous chloride solution is applied to the substrate, and the substrate then is exposed to a palladium salt solution for causing palladium to be deposited by chemical reduction thereon. The palladium layer may serve as a catalyst for initiating the chemical deposition of a wide variety of metals, including palladium, Permalloy, cobalt, nickel and copper, using the appropriate electroless plating bath in each instance. The deposited metal also serves as an additional catalyst to induce further depositions.

In the present case it is desired that the reducing agent be effectively applied to only a selected portion of the substrate surface. This is accomplished in the present instance merely by immersing the glass substrate and its etched silicon monoxide layer for 60 seconds at room temperature in a stannous chloride solution containing 20% $SnCl_2$, the remainder being a 5 normal HCl solution. The stannous chloride solution is readily absorbed by the silicon monoxide layer, which has been etched to make it liquid-retentive. After being so immersed, the substrate is rinsed in water, which removes the stannous chloride solution from the uncoated glass surface but does not entirely remove it from the absorptive layer of etched silicon monoxide.

The next step in the process is to immerse the substrate for 60 seconds in a palladium salt solution consisting of 0.1% $PdCl_2$ in water at room temperature. The stannous chloride that was retained on the silicon monoxide layer causes palladium to be reduced from solution onto the active site defined by the silicon monoxide coating. Only a thin layer of palladium need be deposited. The substrate then is rinsed in readiness for the final electroless plating step. As was mentioned above, palladium is an excellent catalyst for inducing the chemical deposition of a wide variety of plating materials, including Permalloy, nickel and copper.

When a glass substrate has been treated in the above described manner, a metallic film of the desired thickness can readily be built by chemical deposition on a desired portion of the substrate surface, and the result will be a high-quality, low-cost product. This method is much more economical than forming the desired film by vacuum or vapor deposition. There does not appear to be any critical ratio between the plated and unplated surface areas in the present type of plating process.

The plating method described above is subject to many variations. For example, in etching the silicon monoxide layer, it has been found that the strength of the hydrofluoric acid solution can vary from 10% to 50% of hydrofluoric acid in water, and the exposure time can be varied between 10 and 20 seconds for the desired selective etching action. The only necessary requirement is that substantial etching of the silicon monoxide coating must occur during a period in which there is only negligible etching of the bare glass. If this condition is met, then the silicon monoxide coating will absorb stannous chloride (or whatever other reducing agent is employed) and will thereafter retain a sufficient amount of this reagent, after rinsing of the substrate, to serve as an active site for the chemical reduction of metal thereon, thus insuring that electroless plating will take place on the silicon monoxide coated site under conditions that are not conducive to such action elsewhere on the substrate surface.

Although a 60-second immersion time in the stannous chloride or the palladium salt solution has been described hereinabove, acceptable results have been achieved also with shorter immersion times, as low as 10 or 15 seconds in some cases, without requiring that these solutions be heated above room temperature. The only necessary condition is that enough of the desired substance must be left adhering to the selected site in each instance to induce the next chemical reaction in the process.

To summarize the foregoing description, the invention utilizes two well-known types of deposition techniques that have not previously been combined in one coating process. The first of these is the technique for depositing silicon monoxide upon a selected surface area of arbitrary size and shape. The second technique is the one which has been developed for chemically plating nonconductive substrates, although heretofore it has been used generally for plating an entire surface of a substrate rather than a selected portion thereof. These two techniques ordinarily are not combined in the same process for the reason that silicon monoxide, because of its normal surface smoothness, is not considered a good base for electroless deposition. However, in the present instance the silicon monoxide is treated specially to give it a granular texture for absorbing and retaining a reducing agent which may be utilized in a chemical plating operation. The property of silicon monoxide that makes it particularly useful for this purpose is the rapidity with which it etches in comparison with the etching rate of glass. Thus, the silicon monoxide layer can be selectively etched to impart the desired porosity to it while the adjoining substrate surface is left smooth. As explained above, this provides the conditions necessary for the initial phase of a selective electroless deposition process.

In addition to serving as an intermediate product in a selective electroless plating process, as described hereinabove, the glass base or other substrate with its etched silicon monoxide coating also may have utility as a commercial product that can be supplied to electroless plating installations for use in their selective plating operations. This article can be made cheaply and accurately to the specifications of individual users, according to the particular film patterns that they may wish to deposit upon their substrates.

While the invention has been particularly shown and described with reference to a preferred embodiment thereof, it will be understood by those skilled in the art that various changes in form and details may be made therein without departing from the spirit and scope of the invention.

What is claimed is:

1. A method of treating a glassy substrate so that it can be plated by electroless deposition upon only a selected portion of its surface area, said method comprising the steps of:

depositing upon the selected portion of the substrate surface a coating of silicic material having the stoichiometric properties of silicon monoxide.

and exposing the substrate and its selectively deposited silicic coating to a hydrofluoric acid solution which renders the silicic coating highly porous without substantially increasing the porosity of the uncoated substrate surface.

2. A method of treating a glassy substrate so that it can be plated by electroless deposition upon only a selected portion of its surface, substantially excluding its remaining surface area, said method comprising the steps of:

depositing upon the selected portion of the substrate surface a coating of silicic material having the stoichiometric properties of silicon monoxide.

and exposing the substrate and the selectively deposited silicic coating thereon to a hydrofluoric acid solution capable of forming a substantial density of micropores in the silicic coating during a time insufficient to produce a significant reaction between the etchant and the uncoated portion of the substrate.

3. A method of preparing a substrate of nonconductive material which will receive plating by electroless deposition upon only a selected portion of the substrate surface, said method comprising the steps of:

depositing upon a selected portion of a glass base a coating silicic material having the stoichiometric properties of silicon monoxide, and exposing said base and said coating to dilute hydrofluoric acid for a time sufficient to etch said coating without substantially etching the uncoated surface of said glass base, thereby rendering said coating porous while the uncoated glass surface remains substantially impervious.

4. A method comprising the steps set forth in claim 3 and the following additional steps:

exposing the glass base and the porous coating thereon to an aqueous reducing agent, rinsing said base to remove the reducing agent from the glass surface without completely removing the same from the porous coating, and exposing said base and said coating to a solution containing an electroless catalytic agent for causing said catalytic agent to be deposited by chemical reduction upon said coating without being deposited to any significant extent upon the uncoated surface of the glass base.

5. A method of making an article composed of a nonconductive substrate having metallic plating upon a selected portion thereof, said method comprising the steps of:

depositing upon a selected surface area of a glass base a coating of silicic material having the stoichiometric properties of silicon monoxide, exposing said base and said coating to dilute hydrofluoric acid for a time sufficient to etch said coating without substantially etching the uncoated surface of said base, exposing said base and said coating to a stannous chloride solution for impregnating the coating with said solution, rinsing said base to remove the stannous chloride from the uncoated surface thereof without completely removing the same from the etched coating, exposing said base and the stannous-chloride-impregnated coating to a palladium salt solution for causing a layer of palladium to be deposited by chemical reduction upon said coating, and utilizing said base and its palladium-plated coating as a substrate in an electroless plating bath for causing metal to be deposited by catalytic action upon said coating.

6. An article for use as a substrate in a selective electroless deposition process comprising:

a base of glassy material having a surface which is substantially incapable of retaining a water-soluble reducing agent thereon when subjected to a water rinse, and a coating of silicic material having the stoichiometric properties of silicon monoxide covering a selected portion of the base surface, said coating having an etched porous surface which is capable of retaining a substantial amount of a water-soluble reducing agent thereon when subejcted to a water rinse.

7. An article for use as a substrate in a selective electroless deposition process comprising:

a glass base, a layer of etched silicon monoxide covering a selected portion of the base surface, and a layer of electroless catalytic material adhering to the etched silicon monoxide layer.

8. A method of electrolessly plating a glassy substrate which is receptive to a silicon monoxide coating, comprising the steps of:

coating at least a portion of the substrate surface with a mixture of silicic ingredients that together have the stoichiometric properties of silicon monoxide;

exposing said silicic coating to a hydrofluoric acid solution which attacks the respective ingredients thereof at substantially different rates, thereby rendering the silicic coating porous;

impregnating the porous silicic coating with a chemical reducing agent that is capable of retention by said coating with a chemical reducing agent that is capable of retention by said coating after rinsing of the substrate, and exposing said substrate and its chemically impregnated coating to an electroless deposition bath from which a desired metal can be deposited by chemical reduction upon said coating.

9. An article for use in an electroless plating process comprising:

a glassy substrate, and a porous coating on at least a portion of the substrate surface composed of silicic ingredients contained in a mixture having the stoichiometric properties of silicon monoxide, said ingredients respectively being capable of reacting at substantially different rates when exposed to dilute hydrofluoric acid, said coating thereby being adapted to retain a chemical reducing agent in the pores thereof formed by such selective etching.

References Cited

UNITED STATES PATENTS

| | | | |
|---|---|---|---|
| 2,702,253 | 2/1955 | Bergstrom | 117—54 X |
| 2,872,312 | 2/1959 | Eisenberg | 117—54 X |
| 2,968,578 | 1/1961 | Mochel | 117—54 |
| 3,186,863 | 6/1965 | Foley | 117—45 |

RALPH S. KENDALL, *Primary Examiner.*